United States Patent [19]

Szakasits et al.

[11] 4,211,340
[45] Jul. 8, 1980

[54] CATALYST REGENERATION

[75] Inventors: Julius J. Szakasits, Houston; Thomas C. Wadham, Cypress, both of Tex.

[73] Assignee: Shell Oil Company, Houston, Tex.

[21] Appl. No.: 935,196

[22] Filed: Aug. 21, 1978

[51] Int. Cl.² ........................ B67D 05/34; B01J 37/24
[52] U.S. Cl. .......................................... 222/3; 222/58; 222/76; 252/415; 364/567
[58] Field of Search ................ 222/3, 58, 1, 76, 77; 340/612, 613, 618; 137/101.19, 101.31; 252/415; 177/70, 105; 364/567

[56] References Cited

U.S. PATENT DOCUMENTS

| 3,195,776 | 7/1965 | Helm et al. | 222/76 X |
| 3,481,509 | 12/1969 | Marhaver | 222/58 X |
| 3,800,794 | 4/1974 | Georgi | 222/76 X |
| 3,822,723 | 7/1974 | Crowell et al. | 222/76 X |
| 3,855,458 | 12/1974 | Motter et al. | 364/567 X |
| 4,073,628 | 2/1978 | Gernhardt et al. | 222/58 X |
| 4,094,817 | 6/1978 | Olson et al. | 252/415 |

Primary Examiner—David A. Scherbel
Assistant Examiner—Edward M. Wacyra

[57] ABSTRACT

A system for controlling the addition of small amounts of material to process using the loss-in-weight method. The system uses digital control in combination with an on-off solenoid valve whose on time can be varied to meter the material uniformly at low rates.

8 Claims, 3 Drawing Figures

CATALYST REGENERATION

BACKGROUND OF THE INVENTION

The present invention relates to a system for adding small amounts of material to a flowing stream or process using the loss-in-weight principal. The term 'loss-in-weight' is used to designate a system such as those described in U.S. Pat. Nos. 3,099,368 and 3,452,774 for adding small quantities of materials to process streams or processes. Both of the patents describe systems in which the material is placed in a hopper or other container and continuously weighed as the material is metered from the hopper into the process stream. The disclosed systems use analog circuits and control a flow means such as a valve or the like to meter the material to the process stream. While the systems are satisfactory, the use of a valve which must be accurately positioned to meter the material can cause problems in refinery and chemical plants where corrosive materials are used. For example, in catalytic reforming the catalyst must be periodically regenerated by a process which requires the uniform addition of small amounts of chlorine. Due to the corrosive nature of chlorine, conventional metering systems do not operate successfully. This is particularly true of systems such as those shown in the prior art patents that utilize flow control valves for metering the addition of the material. The valves require accurate positioning which is impossible in a corrosive atmosphere.

BRIEF DESCRIPTION OF THE INVENTION

The present invention solves the above problems by providing a loss-in-weight type of system using digital control. In addition, the system uses a solenoid valve with provisions for controlling both the duty cycle of the valve and the operating frequency of the valve. The control of both the duty cycle and the operating frequency permits the uniform addition of small amounts of chlorine to a catalyst regenerating system. In particular, the invention utilizes a load cell to determine the loss-in-weight of a chlorine cylinder with the analog signal from the load cell being converted to a digital signal. The digital weight signal is compared with a second digital signal representing the desired amount of chlorine to be added per unit of time to provide a control signal. The comparator controls both the operating frequency of the solenoid valve and the time of operation. In addition, a separate frequency is used to control the on and off duty cycle of the solenoid valve. The combination of a digital system which permits the on and off operation of the solenoid valve with means for controlling both the operating cycle and the duty cycle of the solenoid valve provides accurate control over the addition of chlorine to the catalyst regenerating system.

BRIEF DESCRIPTION OF THE DRAWING

The present invention will be more easily understood from the following detailed description of a Preferred Embodiment when taken in conjunction with the attached drawing in which.

PREFERRED EMBODIMENT

Figure 1:
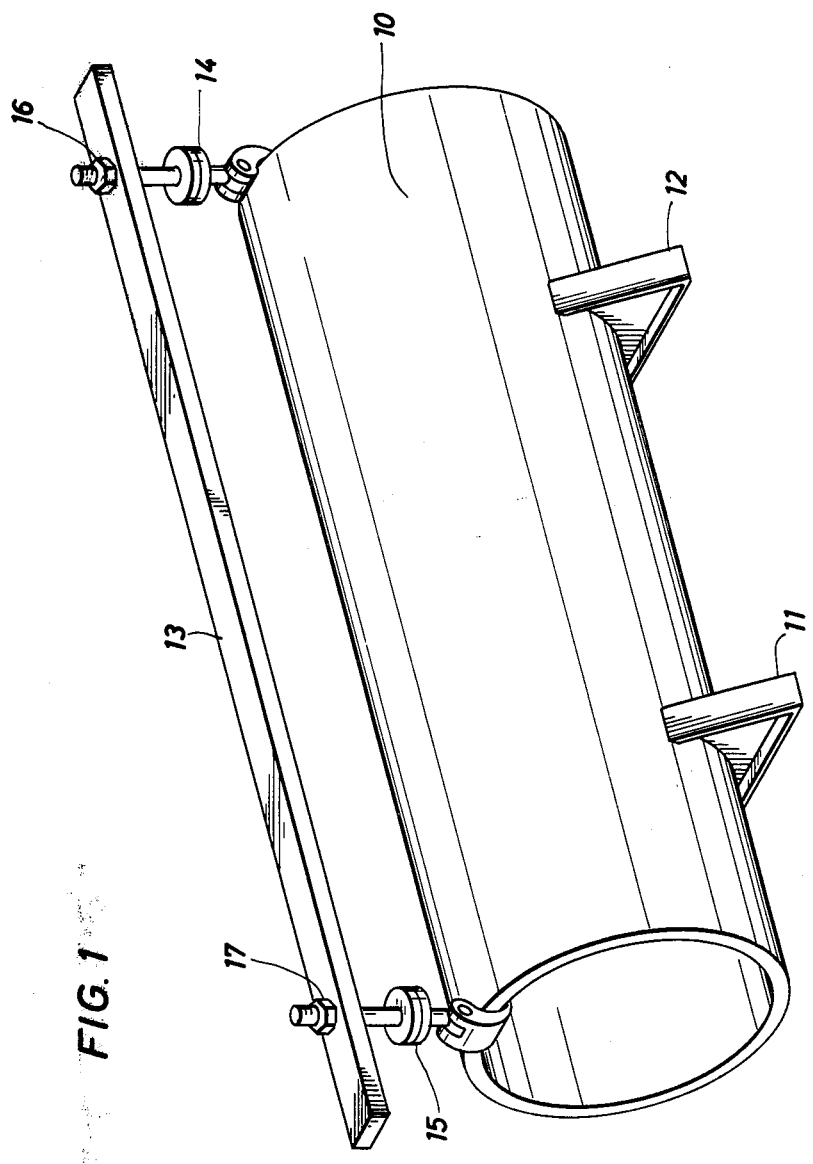
FIG. 1 shows a pictorial view of the chlorine tank and the means for suspending it from the load cell.

Referring now to FIG. 1, there is shown the support for the chlorine tank 10. In particular, the chlorine tank 10 normally rests on suitable chocks 11 and 12 and is suspended by means of hooks 14 and 15 from the beam 13. The hook 15 includes a load cell while the hook 14 forms a pivot point with the two hooks being at the same level. Means are provided for raising the chlorine cylinder from the chocks such as nuts 16 and 17 and threaded rods, as shown, or hydraulic actuators which are attached to the hook members. This arrangement provides a simple means by which standard chlorine tanks may be handled using conventional equipment and still provide for accurate weighing of the chlorine cylinder. Of course, the load cell signal will be one half the weight of the chlorine signal. Normally, the chlorine cylinder will rest on the chocks and only be raised when the system is operated to add chlorine to the catalyst regeneration system.

Figure 2:
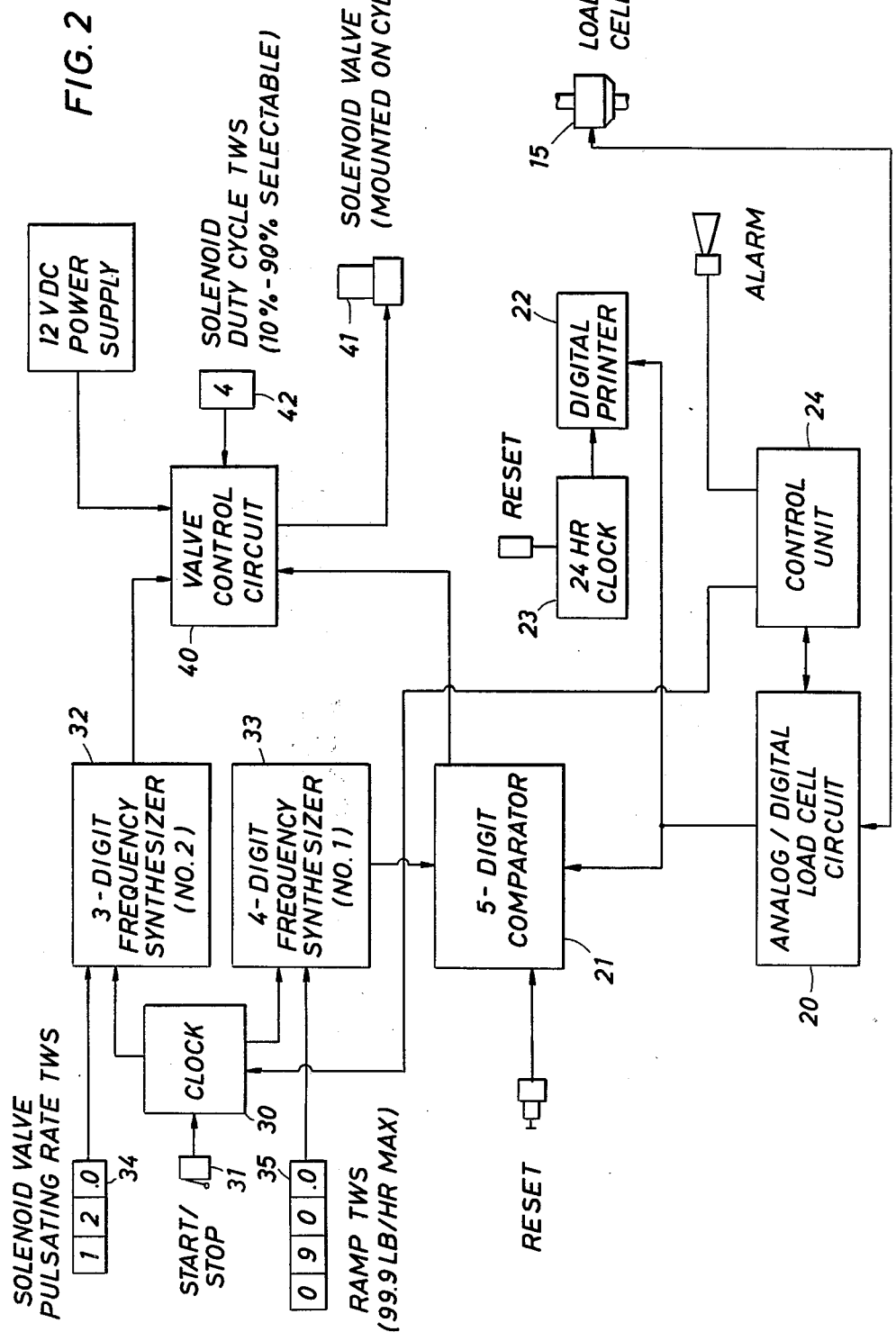
FIG. 2 is a block diagram of the system used for controlling the operation of the solenoid valve, and, FIG. 3 is a graph representing the combination of the solenoid valve's operating cycle and its duty cycle.

Referring now to FIG. 2, there is shown the control system for controlling the solenoid valve 41. The solenoid valve 41 is connected in the discharge line of the chlorine tank and serves to control the flow of chlorine from the tank to the catalyst regenerating system. The load cell 15 is coupled to an analog to digital load cell circuit 20 that converts the analog signal from the load cell to a five digit binary number indicating the weight of the chlorine tank. Since the load cell is only weighing one half of the tank, the signal from the load cell is multiplied by two to give the actual weight of the tank. The load cell circuit is coupled to a control unit 24 which controls the operation of the clock 30. The clock 30 supplies a fixed frequency to three and four-digit frequency synthesizing circuits 32 and 33. The frequency produced by the synthesizing circuits is controlled by thumbwheel switches 34 and 35 which serve to adjust the dividing circuits in the synthesizers which divide the clock frequency to supply the desired frequencies. The synthesizer 32 controls the pulsing rate of the solenoid valve while the synthesizer 33 covers the rate per time unit of addition of the chlorine. In particular, the signal or frequency from the synthesizer 33 is supplied to the five digit comparator 21 where it is compared with the actual weight of the chlorine tank to determine when the solenoid valve should be operated. In the example shown in FIG. 3 the load cell circuit supplies a five digit number corresponding to the change in weight of two-tenths of a pound in the chlorine tank while the frequency synthesizer supplies a pulse train where each step represents one-tenth pound addition of chlorine to the regeneration system. The frequency with which the four-digit numbers are supplied is controlled by the thumbwheel switch 35 and the clock 30. The comparator supplies a signal to the control circuit 40 which either permits the solenoid valve 41 to operate or suspends the operation of the solenoid valve 41. For example, if the signal from the load cell circuit is less than the signal from the synthesizer, the comparator allows the solenoid valve to continue operation. The frequency of pulsing of the solenoid valve is controlled by the signal from the synthesizer 32 while the duty cycle is controlled by the thumbwheel switch 42. In particular, the thumbwheel switch will control the width of the positive pulse received from the synthesizer while the width of the negative pulse will remain constant. The positive pulse is used to control the time the solenoid valve is open while the valve is closed at all other times. Thus, the valve will remain open for a variable time depending upon the setting of the switch.

Figure 3:
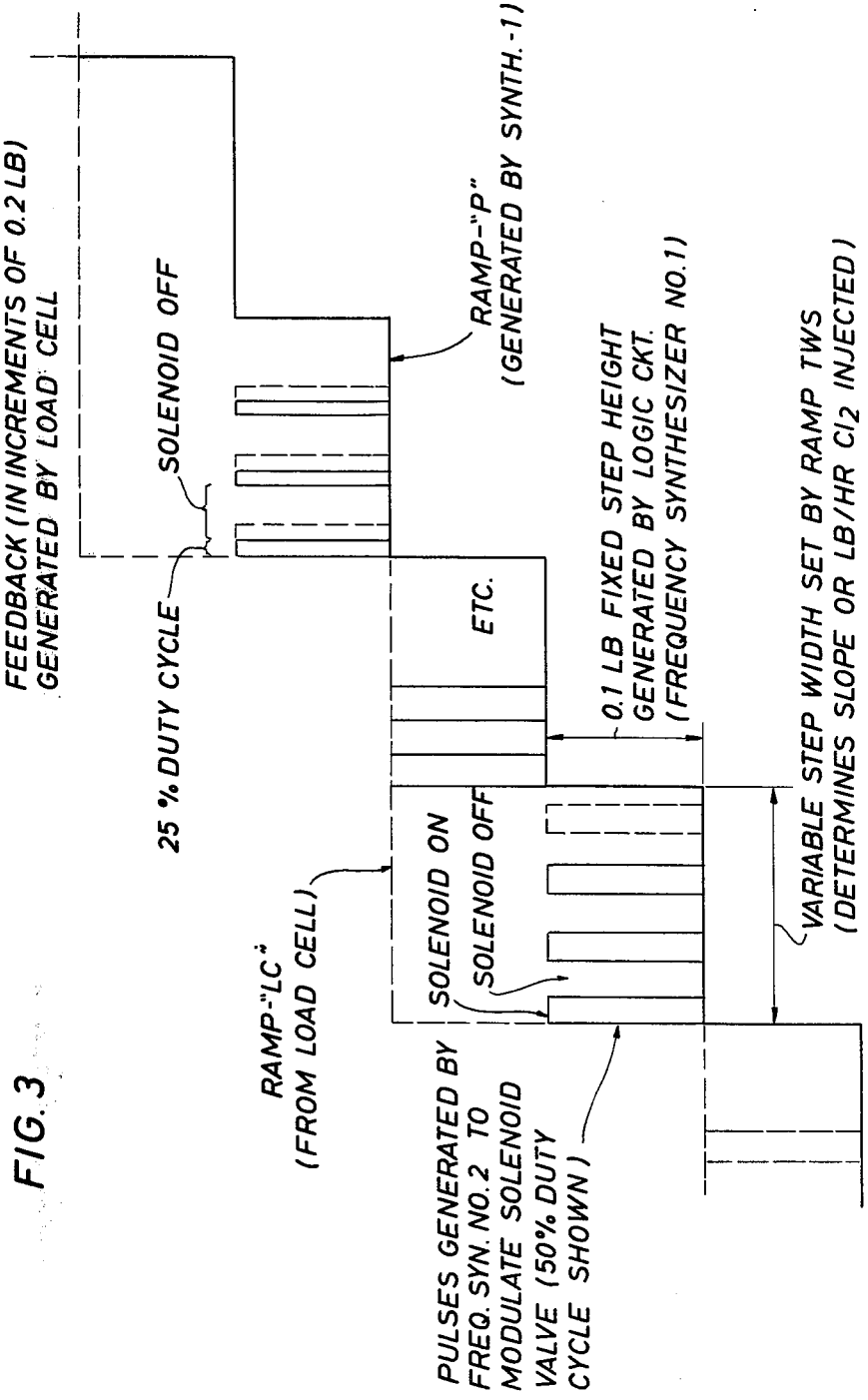

Referring to FIG. 3, there is shown the signals corresponding to a combination of the load cell and the two frequency synthesizers. As shown, the length of the solid ramp steps is set by the synthesizer and particularly the thumbwheel switch which determines the frequency at which the synthesizer generates a number equal to one tenth of a pound of chlorine. The one-tenth pound chlorine signal determines the height of each ramp step since the one-tenth pound ramp steps remain constant. When it is desired to inject more chlorine the length of the ramp steps corresponding to the time between signals is shortened while the opposite is done if it is desired to inject less. Superimposed on top of each of the ramp steps are positive and negative pulses which indicate the on and off period of the solenoid. The number of pulses actually supplied to the solenoid will be determined by the control circuit 40 while the width of the positive pulse which determines the duty cycle of the solenoid is determined by the setting of the thumbwheel switch 42. Also shown in FIG. 3 is a dotted ramp which indicates the signal from the load cell and is shown in two-tenths pound increments.

The above description is seen that the amount or quantity of chlorine injected is controlled by the setting of the synthesizer 33 while the uniformity of the injection rate is controlled by the synthesizer 32. In normal operations the solenoid valve should be pulsed at a rate and a duty cycle which permits substantially continuous operation of the solenoid valve. It should only be necessary to shut the solenoid down at infrequent intervals to allow the quantity of chlorine injected to agree with the desired amount. Of course, the solenoid valve must be maintained open for a sufficient length of time to permit it to inject the one-tenth pound of chlorine during the width or length of each ramp step from the synthesizer 33.

We claim as our invention:

1. A system for controlling the addition of small amounts of material to a process comprising:
    a container for said material, said container being connected to said process to supply the material thereto;
    weighing means disposed to weigh said container and material;
    a valve means disposed in the connection between said container and said process to control the flow of material to said process; and,
    a control system, said control system being coupled to said weighing means and said valve means to intermittently open and close the valve means at a preselected modulation frequency to provide a controlled flow of said material to said process and further suspending operation of the valve means in response to sensing a predetermined change in weight of said container and material.

2. The system of claim 1 wherein said valve means is a solenoid valve pulsed in an on-off mode to control the flow of said material.

3. The system of claim 2 and in addition said control system including means for varying the on cycle of said solenoid valve while maintaining the same preselected modulation frequency.

4. The system of claim 3 and in addition said control system including means for varying the quantity of material added to said process per unit of time.

5. The system of claim 4 wherein said control system comprises, a clock, a first controllable frequency synthesizer coupled to said clock for producing a first frequency; a second controllable frequency synthesizer coupled to said clock for producing said preselected modulation frequency, said first frequency being used to control the operation and suspension of operation of said solenoid valve and said modulation frequency being used to control the frequency of operation of said solenoid.

6. The system of claim 5 and in addition a comparing circuit, both said first controllable frequency synthesizer and said weighing means being coupled to said comparing circuit; said comparing circuit being coupled to a valve control circuit disposed to control the operation and suspension of operation of said solenoid valve.

7. The system of claim 1 wherin said material is a gas contained in a storage vessel under pressure.

8. The system of claim 7 wherein said storage vessel is suspended at one end from a fixed beam and at the other end by a load cell.

* * * * *